United States Patent

Hadaway et al.

[11] Patent Number: 5,107,676
[45] Date of Patent: Apr. 28, 1992

[54] REDUCTION GEAR ASSEMBLY AND A GAS TURBINE ENGINE

[75] Inventors: Edward S. Hadaway, Derby; Norman J. Wedlake, Bristol, both of England

[73] Assignee: Rolls-Royce plc, London, England

[21] Appl. No.: 534,882

[22] Filed: Jun. 8, 1990

[30] Foreign Application Priority Data

Jul. 21, 1989 [GB] United Kingdom ............... 8916659

[51] Int. Cl.[5] ........................... F02K 3/02; F01M 9/10
[52] U.S. Cl. .................................. 60/226.1; 60/39.08; 184/6.11
[58] Field of Search ..................... 60/226.1, 39.08; 184/6.11

[56] References Cited

U.S. PATENT DOCUMENTS 4,782,658 11/1988 Perry ........................... 60/226.1
4,930,601 6/1990 Leidecker et al. ............. 184/6.11

FOREIGN PATENT DOCUMENTS 671396  5/1952 United Kingdom.
798273  7/1958 United Kingdom.
2071510  9/1981 United Kingdom.
2135740A 9/1984 United Kingdom.
2160291A 12/1985 United Kingdom.
2180892A 4/1987 United Kingdom.
2209371A 6/1988 United Kingdom.

Primary Examiner—Richard A. Bertsch
Assistant Examiner—Howard R. Richman
Attorney, Agent, or Firm—Oliff & Berridge

[57] ABSTRACT

A turbofan gas turbine engine (10) comprises a fan rotor (32) driven by a core engine (11) via a shaft (36) and a reduction gear (38). A lubricant source (63) is arranged to supply lubricant to the reduction gear (38) to lubricate gear teeth and bearings (52) in the reduction gear (38). An annular collector (76) is positioned coaxially around the reduction gear (38) and is secured to the fan rotor (32) and is driven by the reduction gear (38). The annular collector (76) is arranged to collect lubricant leaving the reduction gear (38) on its inner surface. A number of static scoops (82) collect lubricant from adjacent the inner surface of the annular collector (76) to return the lubricant to valves (86). The valves (86) allow the lubricant to return to the lubricant source (63) in normal operation. If the lubricant source (63) fails to supply lubricant to the reduction gear (38) the valve (86) returns the lubricant to the reduction gear (38) to allow the reduction gear (38) to operate for a period of time without a supply of lubricant.

28 Claims, 3 Drawing Sheets

REDUCTION GEAR ASSEMBLY AND A GAS TURBINE ENGINE

The present invention relates to reduction gear assemblies and to gas turbine engines arranged to drive bladed rotors via reduction gear assemblies and in particular to turbofan gas turbine engines arranged to drive fan rotors via reduction gear assemblies.

A problem concerned with reduction gear assemblies for driving bladed rotors is that lubricant is usually drained, or scavenged, under gravity from the reduction gear assembly, and is supplied through hollow vanes which extend across the gas turbine engine flow path to a lubricant source. These vanes have large cross-sections to enable a lubricant duct of relatively large passage area to be incorporated therein. These vanes do not perform an aerodynamic function.

These vanes of large cross-section may be obviated, by having lubricant ducts of smaller passage area passing through existing smaller cross-section aerodynamic vanes, and supplying the lubricant through the lubricant ducts under pressure. One proposed method is to use a gear pump to pressurise the lubricant, however gear pumps are relatively complicated, bulky and are difficult to locate in proximity to the reduction gear assembly within the gas turbine engine.

The present invention seeks to provide a gas turbine engine arranged to drive a bladed rotor via a reduction gear assembly in which the reduction gear assembly has a novel pressurised lubricant scavenge system to return lubricant to the lubricant source.

Accordingly the present invention provides a gas turbine engine comprising a core engine, a rotor having a plurality of radially outwardly extending rotor blades secured thereto, the core engine being arranged to drive the rotor via shaft means and a reduction gear assembly, a source of lubricant being arranged to supply lubricant to the reduction gear assembly, an annular lubricant collecting member being positioned coaxially around the reduction gear assembly to collect lubricant leaving the reduction gear assembly, the annular lubricant collecting member being driven by the reduction gear assembly, at least one lubricant scoop being arranged to collect lubricant from adjacent the inner surface of the annular lubricant collecting member and being arranged to return the lubricant under pressure to the lubricant source.

The present invention seeks to provide a reduction gear assembly which has a novel pressurised lubricant scavenge system to return lubricant to the lubricant source.

Accordingly the present invention provides a reduction gear assembly arranged to be driven by drive means, a source of lubricant being arranged to supply lubricant to the reduction gear assembly, an annular lubricant collecting member being positioned coaxially around the reduction gear assembly to collect lubricant leaving the reduction gear assembly, the annular lubricant collecting member being driven by the reduction gear assembly, at least one lubricant scoop being arranged to collect lubricant from adjacent the inner surface of annular lubricant collecting member and being arranged to return the lubricant under pressure to the lubricant source.

A problem concerned with the reduction gear assemblies for driving the bladed rotors is that it is necessary for the reduction gear assemblies to operate for a period of time if there is a failure of a lubricant source to supply lubricant to the reduction gear assemblies. The bearings for the reduction gear assemblies are then susceptible to damage from a lack of lubricant due to lubricant source failure. Plain bearings are the most susceptible to damage.

The present invention seeks to provide a reduction gear assembly which can operate for a period of time if there is a failure of a lubricant source to supply lubricant to the reduction gear assembly if there is a reduction or loss of pressure in the lubricant supplied by the lubricant source.

The present invention seeks to provide a gas turbine engine arranged to drive a bladed rotor via a reduction gear assembly in which the reduction gear assembly can operate for a period of time if there is a failure of a lubricant source to supply lubricant to the reduction gear assembly or if there is a reduction or loss of pressure in the lubricant supplied by the lubricant source.

Accordingly the present invention provides a gas turbine engine comprising a core engine, a rotor having a plurality of radially outwardly extending rotor blades secured thereto, the core engine being arranged to drive the rotor via shaft means and a reduction gear assembly, a source of lubricant being arranged to supply lubricant to the reduction gear assembly, an annular lubricant collecting member being positioned coaxially around the reduction gear assembly to collect lubricant leaving the reduction gear assembly, the annular lubricant collecting member being driven by the reduction gear assembly, at least one lubricant scoop being arranged to collect lubricant from adjacent the inner surface of the annular lubricant collecting member and being arranged to return lubricant to the lubricant source, valve means being arranged to control the flow of lubricant from the lubricant scoop whereby in normal operation the valve means allows the return flow of lubricant from the lubricant scoop to the lubricant source and in the event of at least a reduction of lubricant supply from the lubricant source to the reduction gear assembly the valve means prevents the return flow of lubricant from the lubricant scoop to the lubricant source and interconnects the lubricant scoop and the reduction gear assembly to allow lubricant from the lubricant scoop to return to the reduction gear assembly to form a recirculating lubricant system.

The reduction gear assembly may comprise a sun gear, a plurality of intermediate gears and an annulus gear, the sun gear being arranged to be driven by the shaft means, the intermediate gears being arranged to mesh with the sun gear and the annulus gear, the intermediate gears being rotatably mounted on a gear carrier by bearings.

The intermediate gears may be rotatably mounted on the static structure by plain bearings. The annulus gear may be arranged to drive the rotor, the intermediate gears are idler gears, the gear carrier forms part of a static structure, the annular lubricant collecting member is driven by the annulus gear, the lubricant scoop is static.

The static structure may further comprise a plurality of axially extending members secured to or formed integral with an annular idler gear carrier, the idler gears being rotatably mounted on the axially extending members.

The lubricant source may supply lubricant to the reduction gear assembly through at least one passage formed in the annular idler gear carrier, and passages formed in the axially extending members.

The gear carrier may be arranged to drive the rotor, the intermediate gears are planet gears, the annulus gear forms a part of a static structure, the annular lubricant collecting member is driven by the gear carrier, the lubricant scoop is static. The gear carrier may comprise a plurality of axially extending members, the planet gears being rotatably mounted on the axially extending members. The lubricant source may supply lubricant to the reduction gear assembly through at least one passage formed in the gear carrier and passages formed in the axially extending members.

The static structure may be secured to a plurality of stator vanes, the stator vanes extend radially across the gas flowpath through the core engine.

At least one of the stator vanes may have a passage extending longitudinally therethrough for the supply of lubricant from the lubricant source to the reduction gear assembly.

At least one of the stator vanes may have a passage extending longitudinally therethrough for the return flow of lubricant to the lubricant source.

The valve means may be positioned at the radially inner end of the stator vanes.

The valve means may be positioned at the radially outer end of the stator vanes to allow the lubricant to flow through the at least one vane for cooling of the lubricant when there is a reduction of lubricant supply from the lubricant source.

The valve means may be a penny valve or a bobbin valve.

The gas turbine engine may be a turbofan gas turbine engine, the rotor is a fan rotor and the rotor blades are fan rotor blades.

The lubricant scoop may be secured to the stator vanes.

The valve means may prevent the return flow of lubricant from the lubricant scoop to the lubricant source and returns the lubricant from the lubricant scoop to the reduction gear assembly in the event of a failure of the lubricant source to supply lubricant to the reduction gear assembly.

The present invention also provides a reduction gear assembly arranged to be driven by drive means, a source of lubricant being arranged to supply lubricant to the reduction gear assembly, an annular lubricant collecting member being positioned coaxially around the reduction gear assembly to collect lubricant leaving the reduction gear assembly, the annular lubricant collecting member being driven by the reduction gear assembly, at least one lubricant scoop being arranged to collect lubricant from adjacent the inner surface of the annular lubricant collecting member and being arranged to return lubricant to the lubricant source, valve means being arranged to control the flow of lubricant from the lubricant scoop whereby in normal operation the valve means allows the return flow of lubricant from the lubricant scoop to the lubricant source and in the event of at least a reduction of lubricant supply from the lubricant source to the reduction gear assembly the valve means prevents the return flow of lubricant from the lubricant scoop to the lubricant source and interconnects the lubricant scoop and the reduction gear assembly to allow lubricant from the lubricant scoop to return to the reduction gear assembly to form a recirculating lubricant system.

The present invention will be more fully described by way of example with reference to the accompanying drawings, in which.

Figure 1:
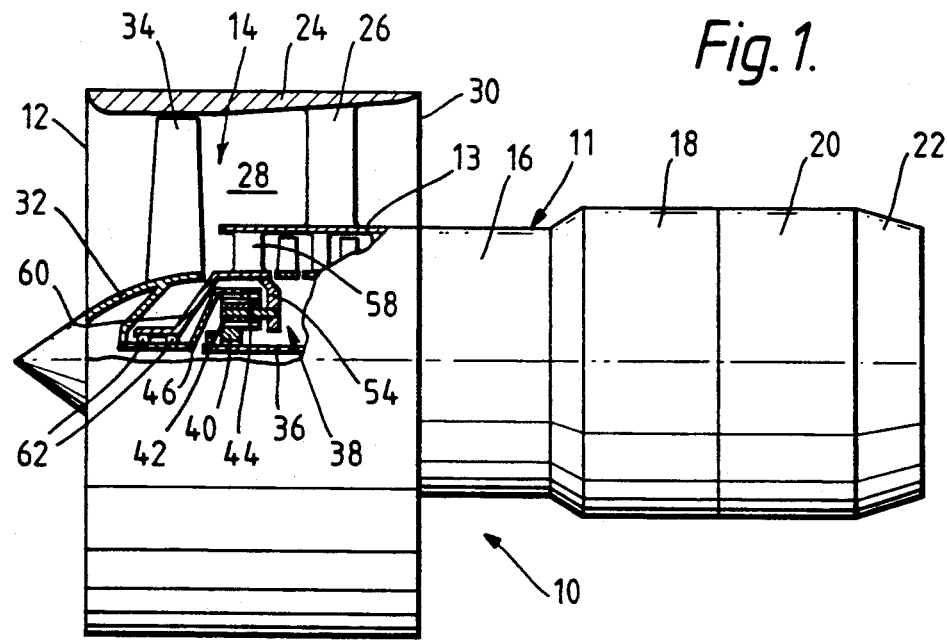
FIG. 1 is a partially cut away view of a turbofan gas turbine engine according to the present invention.

A turbofan gas turbine engine 10, shown in FIG. 1, comprises in axial flow series an inlet 12, a fan section 14, a compressor section 16, a combustion section 18, a turbine section 20 and an exhaust nozzle 22. The compressor section 16, combustion section 18, turbine section 20 and exhaust nozzle 22 form a conventional core engine 11. The compressor section 16 of the core engine 11 may comprise a single compressor or it may comprise a low pressure compressor and a high pressure compressor in axial flow series. Similarly the turbine section 20 of the core engine 11 may comprise a single turbine to drive the single compressor or it may comprise a high pressure turbine and a low pressure turbine in axial flow series to drive the high pressure compressor and low pressure compressor respectively. The turbine section 20 may have a single turbine or the low pressure turbine to drive the fan section 14, or a separate power turbine may be provided to drive the fan section.

A fan casing 24 surrounds the fan section 14, and the fan casing 24 is secured to a core engine casing 13 by a plurality of circumferentially arranged struts 26. A fan duct 28 is defined between the fan casing 24 and the core engine casing 13 and the fan duct 28 has an outlet 30. The fan section 14 comprises a fan rotor 32 which has a plurality of circumferentially arranged radially outwardly extending fan rotor blades 34 secured thereto. The fan rotor 32 is arranged coaxially with the fan casing 24 and the core engine 11.

A shaft 36 is connected to one of the turbines in the turbine section 20 and allows the turbine section 20 to drive the fan rotor 32 via a reduction gear assembly 38. The reduction gear assembly 38 comprises a sun gear 40, a plurality of idler gears 42 and an annulus gear 44. The sun gear 40 is connected to and is driven by the shaft 36. The idler gears 42 mesh with and are driven by the sun gear 40, and the annulus gear 44 meshes with and is driven by the idler gears 42. The annulus gear 44 is connected to and drives the fan rotor 32 via a shaft 46.

The idler gears 42 are rotatably mounted on axially extending members 48,50 by plain bearing surfaces 52. The downstream ends of the axially extending members 48,50 fit, and are secured, into apertures 56 in an annular idler gear carrier member 54. The idler gear carrier member 54 and the axially extending members 48,50 form a static structure to carry the idler gears 42. The idler gear carrier member 54 is secured to the radially inner ends of a plurality of circumferentially arranged stator vanes 58 which extend radially across the gas flowpath through the core engine 11. The radially outer ends of the stator vanes 58 are secured to the core engine casing 13. A conical static support member 60 is also secured to the radially inner ends of the stator vanes 58 and the conical support member 60 extends in an upstream direction therefrom. The shaft 46 is rotatably mounted in the support member 60 by a pair of axially spaced bearings 62, and is rotatably mounted with respect to the shaft 36 by a bearing 90.

The gears are single helical gears so that part of the forward thrust load from the fan rotor is transferred through the gears from the low speed shaft 46 to the high speed shaft 36. A portion of the end load is taken by the idler gears and the remaining load is taken by the bearing 90 positioned between shafts 36 and 46. The annulus gear 44 is offset in a downstream direction from the sun gear 40 so that the couple from the end loads can be balanced by an opposing couple from the radial loads generated by the tooth flank angles. The axially extending members 48,50 are arranged so that as they deflect under load the gears remain square to the line of action.

A lubricant source 63 is arranged to supply lubricant to the reduction gear assembly 38 to lubricate the intermeshing teeth of the gears 40,42 and 44 and the bearing surfaces 52 between the idler gears 42 and the axially extending members 48,50. The lubricant source 63 supplies a lubricant, for example oil through first pipes 64 which pass through the stator vanes 58. The first pipes 64 supply the lubricant to second pipes 65 which in turn supply the lubricant to third passages 66 formed in the idler gear carrier 54. The third passages 66 in the idler gear carrier 54 supply the lubricant through first apertures 68 formed in the axial extending member 48 into a chamber 70 formed within the axially extending member 50. A plurality of second apertures 72 extend through the axially extending members 48,50 to supply lubricant from the chamber 70 to the bearing surfaces 52 of the idler gears 42 and axially extending member 50, lubricant also flows from the bearing surfaces 52 to the gear teeth.

An annular lubricant collecting member 76 is secured to the shaft 46 and is driven by the annulus gear 44, the annular lubricant collecting member 76 is positioned coaxially around the annulus gear 44 and is connected to the shaft 46 by a member 78.

Lubricant leaving the bearing surfaces 52 and gear teeth at the upstream end of the reduction gear assembly 38 is flung radially outwardly onto the shaft 46, and is centrifuged along the radially inner conical surface of the shaft 46 to a plurality of apertures 74 which extend through the shaft 46 to a plurality of apertures 74 which extend through the shaft 46 as shown by arrows A. The lubricant flows through the apertures 74 over the radially inner surface of the member 78 and through apertures 80 into a trough on the radially inner surface of the annular lubricant collecting member 76.

Lubricant leaving the bearing surfaces 52 and gear teeth at the downstream end of the reduction gear assembly 38 is flung radially outwardly directly onto the radially inner surface of the annular collecting member 76, and then flows through the apertures 80 into the trough.

A plurality of static lubricant scoops 82 are secured to the radially inner ends of the stator vanes 58 and the lubricant scoops 82 are arranged to collect lubricant from the trough adjacent the inner surface of the annular collecting member 76. The lubricant flows through diffusing sections 83 of the lubricant scoops 82 which diffuse the oil to raise its static pressure. The lubricant scoops 82 are arranged to return the lubricant to the lubricant source 63. The lubricant scoops 82 return the lubricant through fourth pipes 84 and fifth pipes 85, which pass through the stator vanes 58. The diffusing sections 83 of the lubricant scoops 82 are arranged to raise the static pressure of the lubricant sufficiently to drive the lubricant through the fourth and fifth pipes 84,85, to the lubricant source 63.

Figure 2:
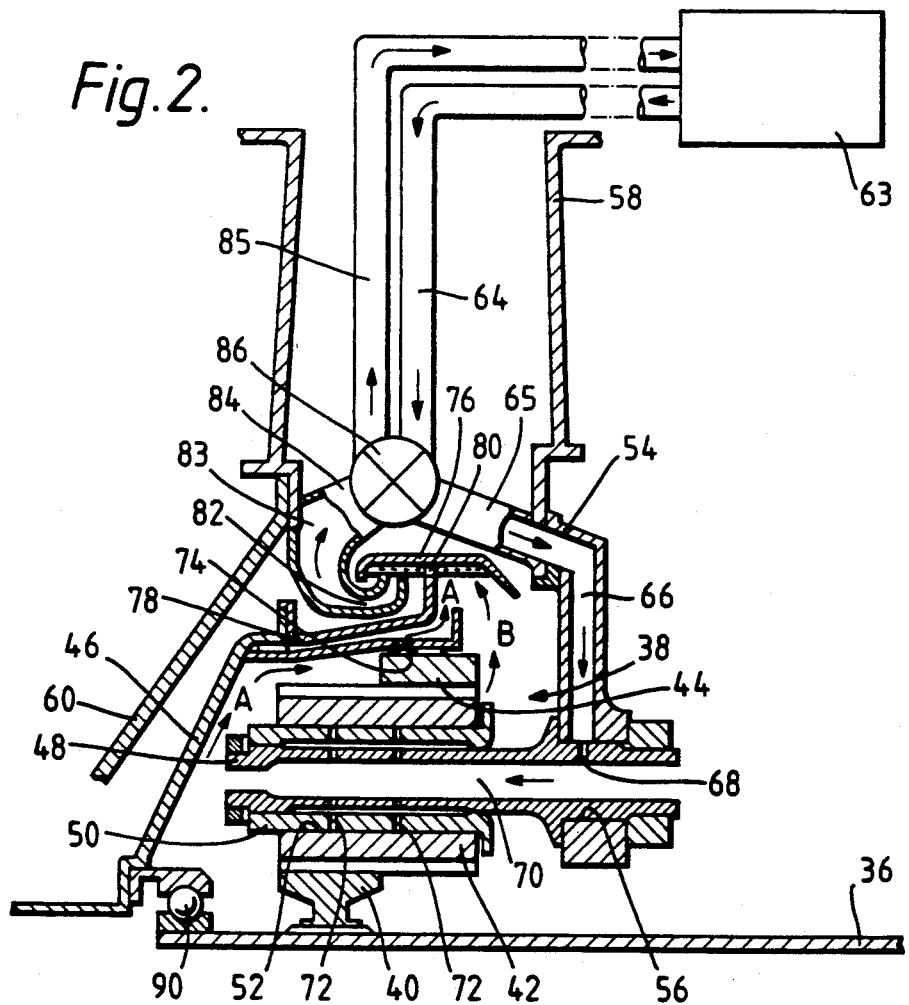
FIG. 2 is a longitudinal cross-sectional view to an enlarged scale showing the reduction gear assembly of the turbofan gas turbine engine shown in FIG. 1.

One or more valves 86 are arranged to control the flow of lubricant from the lubricant scoops 82. In FIG. 2, the fourth pipes 84 supply lubricant to the valves 86, and the fifth pipes 85 supply lubricant from the valves 86 to the lubricant source 63. The valves 86 are positioned at the radially inner ends of the stator vanes 58. The first pipes 64 supply lubricant to the valves 86, and the second pipes 65 supply lubricant from the valves 86 to the bearing assembly 38. In normal operation the valves 86 allow the lubricant source 63 to supply lubricant to the reduction gear assembly 38, and the lubricant is collected by the annular lubricant collecting member 76 and the lubricant scoops 82. The lubricant scoops 82 supply the lubricant to the fourth pipes 84 and the valves 86 allow the lubricant to return through the fifth pipes 85 to the lubricant source 63. However in abnormal operation, for example if the lubricant source 63 does not supply lubricant to the reduction gear assembly 38, if there is a reduction or a loss of pressure in the pressure of the lubricant supplied by the lubricant source 63, the valves 86 prevent the return flow of lubricant collected by the lubricant scoops 82 to the lubricant source 63.

The valves 86 return the lubricant through the second pipes 65 and the third passages 66 at the radially inner ends of the stator vanes 58, so that the lubricant flows to the reduction gear assembly 38 to form a recirculating lubricant system to ensure that the plain bearings 52 and gear teeth are provided with lubricant to allow continued operation of the reduction gear assembly for a period of time without the supply of lubricant from the lubricant source 63.

Figure 3:
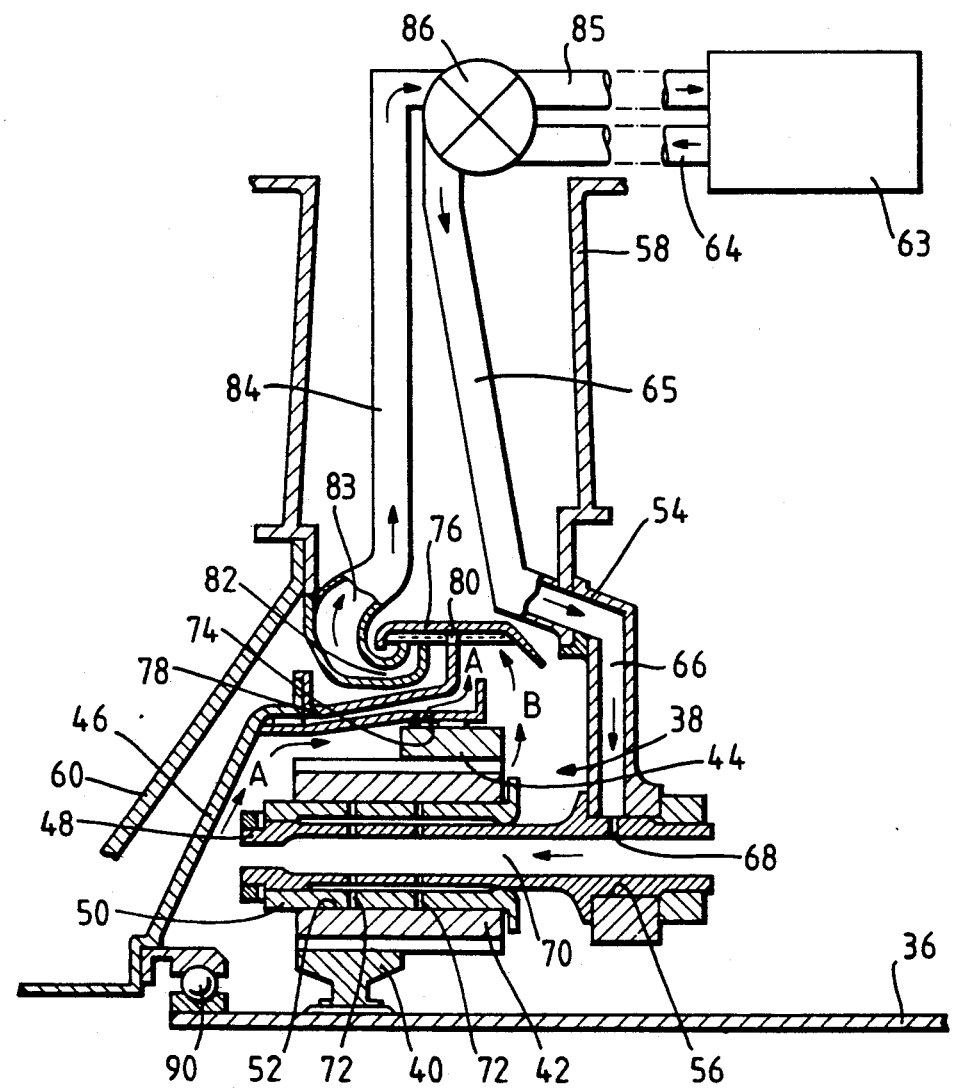
FIG. 3 is a longitudinal cross-sectional view to an enlarged scale showing an alternative embodiment of the reduction gear assembly of the turbofan gas turbine engine shown in FIG. 1.

In FIG. 3 the valves 86 are positioned at the radially outer ends of the stator vanes 58. The valves 86 return the lubricant through the second pipes 65 and third passages 66. The positioning of the valves 86 at the radially outer ends of the stator vanes 58 allows the lubricant to be cooled, as it flows through the portions of the fourth pipes 84 and second pipes 65 positioned in the stator vanes 58, to prevent overheating of the lubricant and reduction gear assembly 63.

During abnormal operation the lubricant in the reduction gear assembly 38 is replenished by lubricant supplied to the bearing 90 positioned between the shafts 36 and 46. The lubricant is normally supplied to the bearing 90 through the shaft 36.

Figure 4:
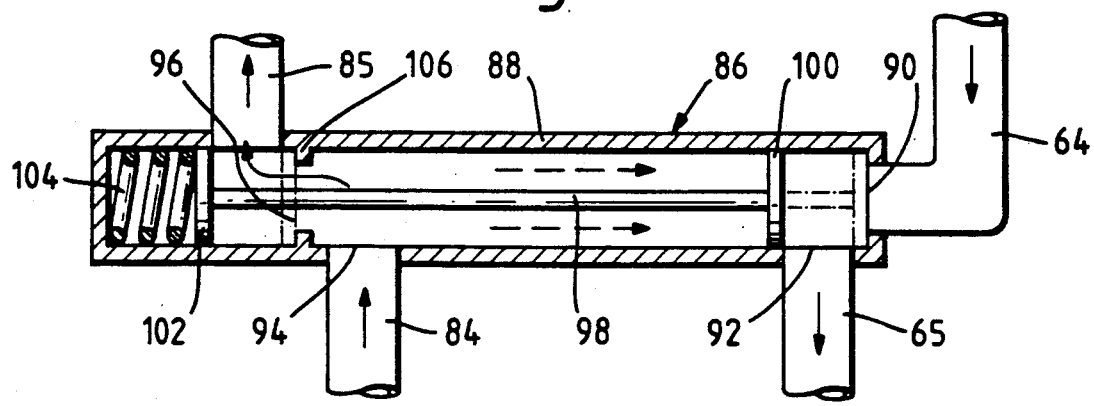
FIG. 4 is a longitudinal cross-sectional view to an enlarged scale through a valve shown in FIG. 2.

In FIG. 4 a valve 86 suitable for controlling the flow of lubricant from the lubricant source 63 to the gear assembly 38, and for controlling the flow of lubricant from the lubricant scoops 82 to the lubricant source 63 is shown. The valve 86 is a bobbin valve and comprises a cylinder 88, which has a bobbin member 98 arranged coaxially therein. The cylinder 88 has four ports 90,92,94 and 96, port 90 is connected to the first pipe 64, port 92 is connected to the second pipe 65, port 94 is connected to the fourth pipe 84 and port 96 is connected to the fifth pipe 85. Ports 90 and 96 are arranged coaxially with the cylinder 88. The bobbin member 98 has a first piston member 100 at one axial end and a second piston member 102 at the opposite axial end. The bobbin member 98 is arranged to be axially movable between a first position and a second position in the cylinder 88, and a spring 104 is arranged to bias the bobbin member 98. The spring 104 acts on the second piston member 102 to bias the bobbin member 98 into the second position so that the first piston member 100 closes port 90 and the second piston member 102 closes port 96. In the second position, shown by the dashed lines, lubricant is neither supplied from the lubricant source 63 to the gear assembly 38 nor returned from the lubricant scoops 82 to the lubricant source 63. But the lubricant collected by the lubricant scoops 82 is returned to the gear assembly 38 because the lubricant is allowed to flow axially through the cylinder 88 from port 94 to port 92. When the pressure of lubricant supplied from the lubricant source 63 reaches a predetermined pressure it overcomes the spring resistance, and moves the bobbin member 98 to the first position, as shown in FIG. 4, so that lubricant is supplied from the lubricant source 63 to the gear assembly 38, and lubricant is returned from the lubricant scoops 82 to the lubricant source 63, but lubricant is not returned directly from the lubricant scoops 82 to the gear assembly. In abnormal operation therefore, when the lubricant source 63 either fails to supply lubricant or the pressure of the lubricant supply falls below the predetermined pressure sufficient to overcome the spring 104, the spring 104 moves the bobbin member 98 to the second position to form the closed recirculating lubricant system.

The valve may also be a penny valve or any other suitable valve.

Although the FIGS. and description have referred to a turbofan gas turbine engine in which the fan rotor is driven by the reduction gear assembly, the invention is equally applicable to a turbopropeller gas turbine engine in which a propeller rotor is driven by a reduction gear assembly.

The invention is also applicable to other types of reduction gear assembly besides those using idler gears rotatably mounted on a fixed idler gear carrier for example planet gears rotatably mounted on a planet gear carrier, in an epicyclic reduction gear assembly.

Figure 5:
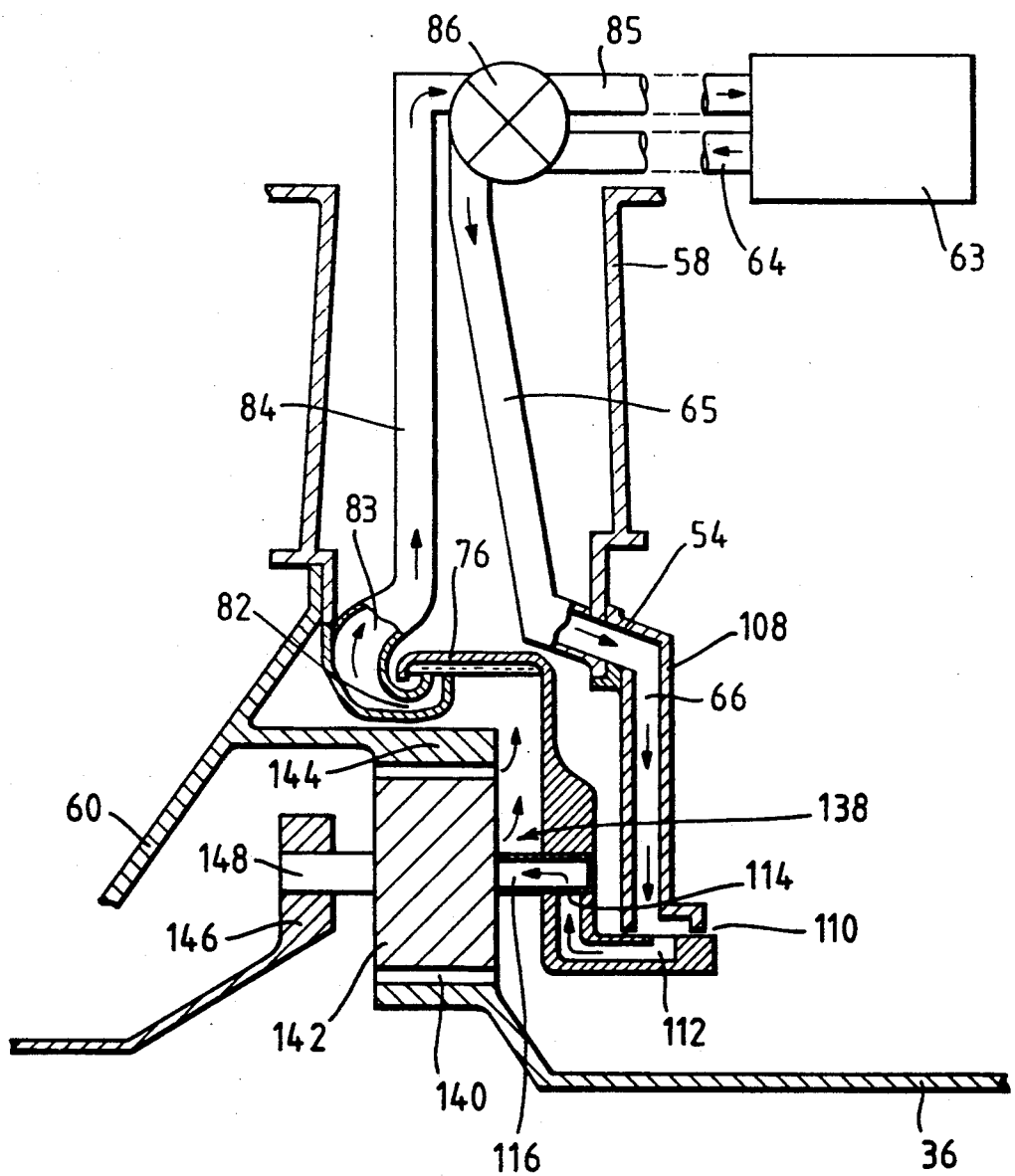
FIG. 5 is a longitudinal cross-sectional view to an enlarged scale showing an alternative embodiment of the reduction gear assembly of the turbofan gas turbine engine shown in FIG. 1.

In FIG. 5 the turbine section 20 drives the fan rotor 32 via an epicyclic reduction gear assembly 138. The reduction gear assembly 138 comprises a sun gear 140, a plurality of planet gears 142 and an annulus gear 144. The annulus gear 144 is secured to static structure i.e. the stator vanes 58 and support member 60. The planet gears 142 are rotatably mounted on a planet gear carrier member 146 via axially extending members 148. The axially extending members 148 are hollow. The lubricant is supplied to the reduction gear assembly 138 via passages 66 formed in further static structure 108 secured to the vanes 58. The passages 66 supply the lubricant to a muff 110 which transfers the lubricant to lubricant passages 112 in the planet carrier member 146. The lubricant passages 112 supply lubricant into chambers 116 within the axially extending members 148 via apertures 114. The annular lubricant collecting member 176 is secured to the planet carrier member 146.

The annular lubricant collecting member must be driven by the reduction gear assembly so that the lubricant is caused to rotate with the annular lubricant collecting member. The lubricant scoop in the examples is shown to be static, the lubricant scoop need not be static, but there must be relative rotation between the annular lubricant collecting member and the lubricant scoop i.e. the annular lubricant collecting member may be driven in the same direction as the lubricant scoop, but at a greater rotational speed or the annular lubricant collecting member and lubricant scoop may be driven in opposite directions.

We claim:

1. A gas turbine engine comprising: a core engine; a rotor having a plurality of radially outwardly extending rotor blades secured thereto; shaft means for mounting the rotor; a reduction gear assembly interconnecting the rotor and core engine, whereby the core engine is arranged to drive the rotor via the shaft means and the reduction gear assembly; a source of lubricant arranged to supply lubricant to the reduction gear assembly; and annular lubricant collecting member positioned coaxially around the reduction gear assembly to collect lubricant leaving the reduction gear assembly, whereby the annular lubricant collecting member is driven by the reduction gear assembly; at least one lubricant scoop relatively rotatable with respect to and arranged to collect lubricant from a trough adjacent to an inner surface of the annular lubricant collecting member, whereby said at least one lubricant scoop is arranged to return lubricant to the lubricant source; and valve means arranged to control the flow of lubricant from the lubricant scoop, whereby in normal operation the valve means allows the return flow of lubricant from the lubricant scoop to the lubricant source, and in the event of at least a reduction of lubricant supply from the lubricant source to the reduction gear assembly, the valve means prevents the return flow of lubricant from the lubricant scoop to the lubricant source and interconnects the lubricant scoop to the lubricant source and the reduction gear assembly to allow the lubricant from the lubricant scoop to return to the reduction gear assembly to form a recirculating lubricant system.

2. A gas turbine engine as claimed in claim 1 in which the reduction gear assembly comprises a sun gear, a plurality of intermediate gears and an annulus gear, the sun gear being arranged to be driven by the shaft means, the intermediate gears being arranged to mesh with the sun gear and the annulus gear, the intermediate gears being rotatably mounted on a gear carrier by bearings.

3. A gas turbine engine as claimed in claim 2 in which the lubricant scoop is secured to a static structure.

4. A gas turbine engine as claimed in claim 2 in which the annulus gear is arranged to drive the rotor, the intermediate gears are idler gears, the gear carrier forms a part of a static structure, the annular lubricant collecting member is driven by the annulus gear, the lubricant scoop is static.

5. A gas turbine engine as claimed in claim 4 in which the static structure further comprises a plurality of axially extending members secured to the idler gear carrier, the idler gears being rotatably mounted on the axially extending members.

6. A gas turbine engine as claimed in claim 5 in which the lubricant source supplies lubricant to the reduction gear assembly through at least one passage formed in the annular idler gear carrier, and passages formed in the axially extending members.

7. The gas turbine engine as claimed in claim 4 in which the static structure further comprises a plurality of axially extending members formed integral with the idler gear carrier, the idler gears being rotatably mounted on the axially extending members.

8. A gas turbine engine as claimed in claim 5 in which the gear carrier is arranged to drive the rotor, the intermediate gears are planet gears, the annulus gear forms a part of a static structure, the annular lubricant collecting member is driven by the gear carrier, the lubricant scoop is static.

9. A gas turbine engine as claimed in claim 8 in which the gear carrier comprises a plurality of axially extending members, the planet gears being rotatably mounted on the axially extending members.

10. A gas turbine engine as claimed in claim 9 in which the lubricant source supplies lubricant to the reduction gear assembly through at least one passage formed in the gear carrier and passages formed in the axially extending members.

11. A gas turbine engine as claimed in claim 3 in which the static structure is secured to a plurality of stator vanes, the stator vanes extend radially across the gas flowpath through the core engine.

12. A gas turbine engine as claimed in claim 11 in which at least one of the stator vanes has a passage extending longitudinally therethrough for the supply of lubricant from the lubricant source to the reduction gear assembly.

13. A gas turbine engine as claimed in claim 12 in which at least one of the stator vanes has a passage extending longitudinally therethrough for the return flow of lubricant to the lubricant source.

14. A gas turbine engine as claimed in claim 12 in which the valve means is positioned at the radially inner end of the stator vanes.

15. A gas turbine engine as claimed in claim 13 in which the valve means is positioned at the radially outer end of the stator vanes to allow the lubricant to flow through the at least one vane for cooling of the lubricant supply from the lubricant source.

16. A gas turbine engine as claimed in claim 1 in which the valve means is a bobbin valve, the bobbin valve comprises a cylinder and a bobbin member arranged coaxially in the cylinder, the cylinder having a first port, a second port, a third port and a fourth port, the first port being connected to the lubricant source, the second port being connected to the reduction gear assembly, the third port being connected to the at least one lubricant scoop, the fourth port being connected to the lubricant source, the bobbin member having a first piston member at a first axial end and a second piston member at a second axial end, the bobbin member being movable axially within the cylinder between a first position in which the lubricant supplied from the lubricant source through the first port to the cylinder is supplied through the second port to the gear assembly and lubricant collected by the at least one lubricant scoop supplied through the third port to the cylinder is returned through the fourth port to the lubricant source and a second position in which the bobbin member closes the first port and fourth port and lubricant collected by the at least one lubricant scoop supplied through the third port to the cylinder is supplied through the second port to the gear assembly.

17. A gas turbine engine as claimed in claim 11 in which the lubricant scoop is secured to the stator vanes.

18. A gas turbine engine as claimed in claim 1 in which the gas turbine engine is a turbofan gas turbine engine, the rotor is a fan rotor and the rotor blades are fan rotor blades.

19. A reduction gear system comprising: a reduction gear assembly driven by drive shaft means; a source of lubricant arranged to supply lubricant to the reduction gear assembly; an annular lubricant collecting member positioned coaxially around the reduction gear assembly to collect lubricant leaving the reduction gear assembly, whereby the annular lubricant collecting member is driven by the reduction gear assembly; at least one lubricant scoop relatively rotatable with respect to and arranged to collect lubricant from a trough adjacent to an inner surface of the annular lubricant collecting member whereby said at least one lubricant scoop is arranged to return lubricant to the lubricant source; valve means arranged to control the flow of lubricant from the lubricant scoop, whereby in normal operation the valve means allows the return flow of lubricant from the lubricant scoop to the lubricant source, and in the event of at least a reduction of lubricant supply from the lubricant source to the reduction gear assembly, the valve means prevents the return flow of lubricant from the lubricant scoop to the lubricant source and interconnects the lubricant scoop and the reduction gear assembly to allow lubricant from the lubricant scoop to return to the reduction gear assembly to form a recirculating lubricant system.

20. A reduction gear assembly as claimed in claim 19 in which the reduction gear assembly comprises a sun gear, a plurality of intermediate gears and an annulus gear, the sun gear being arranged to be driven by the drive shaft means, the intermediate gears being arranged to mesh with the sun gear and the annulus gear, the intermediate gears being rotatably mounted on a gear carrier by bearings.

21. A reduction gear assembly as claimed in claim 20 in which the intermediate gears are idler gears, the gear carrier forms a part of a static structure, the annular lubricant collecting member is driven by the annulus gear, the lubricant scoop is static.

22. A reduction gear assembly as claimed in claim 21 in which the static structure further comprises a plurality of axially extended members secured to the idler gear carrier, the idler gears being rotatably mounted on the axially extending members.

23. A reduction gear assembly as claimed in claim 22 in which the lubricant source supplies lubricant to the reduction gear assembly through at least one passage formed in the annular idler gear carrier, and passages formed in the axially extending members.

24. A reduction gear assembly as claimed in claim 20 in which the intermediate gears are planet gears, the annulus gear forms a part of a static structure, the annular lubricant collecting member is driven by the gear carrier, the lubricant scoop is static.

25. A reduction gear assembly as claimed in claim 24 in which the gear carrier comprises a plurality of axially extending members, the planet gears being rotatably mounted on the axially extending members.

26. A reduction gear assembly as claimed in claim 25 in which the lubricant source supplies lubricant to the reduction gear assembly through at least one passage formed in the gear carrier and passages formed in the axially extending members.

27. A reduction gear system as claimed in claim 19 in which the valve means is a bobbin valve, the bobbin valve comprising: a cylinder and a bobbin member arranged coaxially in the cylinder; the cylinder further comprising a first port, a second port, a third port and a fourth port, the first port being connected to the lubricant source, the second port being connected to the reduction gear assembly, the third port being connected to the at least one lubricant scoop, the fourth port being connected to the lubricant source; the bobbin member further comprising a first piston member at a first axial end and a second piston member at a second axial end, the bobbin member being movable axially within the cylinder between a first position in which the lubricant supplied from the lubricant source through the first port to the cylinder is supplied through the second port to the reduction gear assembly and lubricant collected by the at least one lubricant scoop supplied through the third port to the cylinder is returned through the fourth port to the lubricant source and a second position in which the bobbin member closes the first port and fourth port and lubricant collected by the at least one lubricant scoop supplied through the third port to the cylinder is supplied through the second port to the reduction gear assembly.

28. A reduction gear assembly as claimed in claim 21 in which the static structure further comprises a plurality of axially extending members formed integral with the idler gear carrier, the idler gears being rotatably mounted on the axially extending members.

* * * * *